US008958812B2

(12) United States Patent
Weiguo

(10) Patent No.: US 8,958,812 B2
(45) Date of Patent: Feb. 17, 2015

(54) CELL LOAD BALANCING METHOD AND DEVICES THEREOF

(71) Applicant: Huawei Technologies Co., Ltd., Shenzhen (CN)

(72) Inventor: Niu Weiguo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/159,622

(22) Filed: Jan. 21, 2014

(65) Prior Publication Data

US 2014/0135031 A1    May 15, 2014

Related U.S. Application Data

(63) Continuation of application No. 13/069,802, filed on Mar. 23, 2011, now Pat. No. 8,676,186, which is a continuation of application No. PCT/CN2009/074062, filed on Sep. 21, 2009.

(30) Foreign Application Priority Data

Sep. 24, 2008 (CN) .......................... 2008 1 0161540

(51) Int. Cl.
*H04W 72/00* (2009.01)
*H04W 28/08* (2009.01)
(Continued)

(52) U.S. Cl.
CPC ........... *H04W 28/08* (2013.01); *H04L 43/0882* (2013.01); *H04L 43/16* (2013.01); *H04L 47/125* (2013.01); *H04W 36/22* (2013.01)
USPC ................... 455/453; 455/422.1; 455/446

(58) Field of Classification Search
CPC ............................ H04W 28/08; H04W 36/22
See application file for complete search history.

(56) References Cited

U.S. PATENT DOCUMENTS

| 4,677,005 A | 6/1987 | Riesmeier et al. |
| 8,676,186 B2 * | 3/2014 | Niu ............................ 455/422.1 |

(Continued)

FOREIGN PATENT DOCUMENTS

| CN | 1352497 | 6/2002 |
| CN | 1361606 | 7/2002 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; 3GPP TS 36.300 V8.4.0 (Mar. 2008); pp. 1-126.

(Continued)

*Primary Examiner* — Erika A Washington
(74) *Attorney, Agent, or Firm* — Staas & Halsey LLP

(57) ABSTRACT

A cell load balancing method, a cell load measuring method, and devices thereof are provided. The cell load balancing method includes: acquiring information of the load of a current cell and information of the load an adjacent cell; determining a target cell in which a mobility parameter needs to be modified thereof according to the information of the load of the current cell and the information of the load of the adjacent cell; sending a parameter modification request to the determined target cell; and modifying parameters of the current cell according to content of the parameter modification request if the parameter modification response message is a parameter modification response indicating modification successful. With the above solution, a load balancing solution can be better implemented in a network, thereby improving a capacity of the network, improving a success rate of user access, and reducing access delay.

38 Claims, 5 Drawing Sheets

(51) Int. Cl.
*H04L 12/26* (2006.01)
*H04L 12/803* (2013.01)
*H04W 36/22* (2009.01)

(56) References Cited

U.S. PATENT DOCUMENTS

2009/0016292 A1 1/2009 Viswanath et al.
2009/0088171 A1 4/2009 Aoyama et al.

FOREIGN PATENT DOCUMENTS

| CN | 1377196 | | 10/2002 |
| CN | 1564495 | A | 1/2005 |
| CN | 1571292 | A | 1/2005 |
| CN | 1599471 | | 3/2005 |
| CN | 1829177 | | 9/2006 |
| CN | 100417114 | C | 9/2008 |
| EP | 0189580 | | 12/1985 |
| EP | 1589773 | A1 | 10/2005 |
| EP | 1895801 | | 3/2008 |

OTHER PUBLICATIONS

"3rd Generation Partnership Project; Technical Specification Group Radio Access Network; Evolved Universal Terrestrial Access Network (E-UTRAN); X2 signaling transport (Release 8)"; 3GPP TS 36.422 V8.2.0 (Jun. 2008); pp. 1-8.
"3rd Generation Partnership Project; Technical Specification Group Radio Access Network; Evolved Universal Terrestrial Radio Access Network (E-UTRAN); X2 application protocol (X2AP) (Release 8)"; 3GPP TS 36.423 V8.3.0 (Sep. 2008); pp. 1-85.
Written Opinion of the International Searching Authority, mailed Dec. 31, 2009, in corresponding International Application No. PCT/CN2009/074062 (6 pp.).
Office Action, mailed Aug. 24, 2011, in corresponding Chinese Application No. 200810161540.2 (7 pp.).
Second Chinese Office Action issued Jul. 4, 2012 in corresponding Chinese Patent Application No. 200810161540.2 (5 pages) (5 pages English Translation).
International Search Report, mailed Dec. 31, 2009, in corresponding International Application No. PCT/CN2009/074062 (8 pp.).
Extended European Search Report issued May 7, 2012 in corresponding European Patent Application No. 09817234.9 (13 pages).
Huawei, "Intra frequency load balancing", 3GPP TSG RAN WG3 Meeting #59 bis, Mar. 31-Apr. 3, 2008. (6 pages).
Orange, Telecom Italia, Telefonica, TMobile, "Architecture for load balancing use case", 3GPP TSG RAN WG3 Meeting #58, Nov. 5-10, 2007. (6 pages).
Huawei, "Parameter exchange during load balancing" 3GPP TSG RAN WG3 Meeting #61, Aug. 18-22, 2008 (3 pages).
NEC, "Details on Load Balancing and ICIC Signaling Mechanism" 3GPP TSG-RAN WG3#59, Feb. 11-15, 2008, chapters 2-6 (5 pages).
Nortel, "Discussion on Load Balancing" 3GPP TSG-RAN WG3 Meeting #59bis, Mar. 31-Apr. 3, 2008 (6 pages).
Nortel, "PRB-based approach for non-GBR bearers", 3GPP TSG-RAN WG3 Meeting #59, Feb. 11-15, 2008 (2 pages).
CMCC, Huawei, KPN, "Improvement on PRB-based load balancing" 3GPP TSG-RAN WG# Meeting #60, May 5-9, 2008 (3 pages).
Orange, "Load information exchange for the load balancing use case" 3GPP TSG-RAN WG3 #59, Feb. 11-15, 2008 (5 pages).
Notice of Allowance mailed Oct. 24, 2013 in parent U.S. Appl. No. 13/069,802 (9 pages).
Final Office Action dated Aug. 7, 2012 in parent U.S. Appl. No. 13/069,802 (11 pages).
Non-Final Office Action dated May 10, 2013 in parent U.S. Appl. No. 13/069,802 (9 pages).
Non-Final Office Action dated Dec. 2, 2011 in parent U.S. Appl. No. 13/069,802 (16 pages).
U.S. Appl. No. 13/069,802, filed Mar. 23, 2011, Weiguo Niu, Huawei Technologies Co., Ltd., Shenzhen, P.R. China.
NEC, "*Details on Load Balancing and ICIC Signaling Mechanism*"; 3 GPP TSG-RAN WG3#59, Feb. 11-15, 2008, R3-080389, chapters 8.3.1, 9.1.2 (5 pages).

* cited by examiner

CELL LOAD BALANCING METHOD AND DEVICES THEREOF

CROSS-REFERENCE TO RELATED APPLICATIONS

The application is a continuation of U.S. patent application Ser. No. 13/069,802, now U.S. Pat. No. 8,676,186, filed on Mar. 23, 2011, which is a continuation of International Application No. PCT/CN2009/074062, filed on Sep. 21, 2009. The International Patent Application claims priority to Chinese Patent Application No. 200810161540.2, filed on Sep. 24, 2008. The afore-mentioned patent applications are hereby incorporated by reference in their entireties.

TECHNICAL FIELD

The present invention relates to the field of mobile communication technology, and more particularly to a cell load balancing method and devices thereof.

BACKGROUND

With the development of wireless communication technology, requirements of users on wireless services increasingly become higher. The long term evolution (LTE) technology emerges in order to meet the requirements for faster service transmission, shorter delay, and broader bands.

As the evolution of the Third Generation (3G) technology, the LTE improves and strengthens a 3G air access technology. The future network operating environment will be increasingly complicated with the deployment of LTE networks. The key factors for lowering the networking price are to improve a spectrum utilization rate, simplify the network structure, provide wireless base stations with lower cost, and enhance the maintainability function.

As a technology capable of raising the network automation level and system efficiency and reducing the operating cost, a self-organizing network (SON) has the following characteristics. The network has high degree of intelligence, has good reconfigurability, flexibility, and self-organization, is configured to meet communication requirements in different environments and of different customers, and is a highly autonomous and adaptive network.

As an important feature of the SON network, load balancing (LB) strives for a balanced distribution of a traffic load among different networks, so as to increase a capacity of the network, improve a success rate of user access, and reduce access delay.

SUMMARY

Embodiments of the present invention are directed to a cell load balancing method, a cell load measuring method, and devices thereof, so as to guarantee a balanced distribution of a traffic load and improve a communication quality of a network.

Accordingly, aspects of the present invention employ the following technical solutions in embodiments.

A cell load balancing method is provided in one aspect of the present invention, and the method includes: acquiring information of load of a current cell and information of load of at least one adjacent cell; determining a target cell in which a mobility parameter needs to be modified according to the information of the load of the current cell and the information of the load of the at least one adjacent cell, wherein the target cell is one of the at least one adjacent cell; sending a parameter modification request to the target cell; receiving a parameter modification response message returned by the target cell; modifying parameters of the current cell according to content of the parameter modification request if the parameter modification response message is a parameter modification response indicating modification successful; and abandoning a current modification of the current cell, or initiating a new parameter modification request according to a cause value returned from the target cell if the parameter modification response message is a parameter modification response indicating modification failed.

A cell load balancing device is provided in another aspect of the present invention, and the cell load balancing device includes a processor, a transmitter, and a receiver.

The processor is configured to acquire information of load of a current cell and information of load of at least one adjacent cell, and determine a target cell in which a mobility parameter needs to be modified according to the information of the load of the current cell and the information of the load of the at least one adjacent cell, wherein the target cell is one of the at least one adjacent cell.

The transmitter is configured to send a parameter modification request to the target cell if the mobility parameter of the target cell needs to be modified.

The receiver is configured to receive a parameter modification response message returned by the target cell;

The processor is further configured to modify parameters of the current cell according to content of the parameter modification request if the parameter modification response message is a parameter modification response indicating modification successful; or abandon a current modification of the current cell if the parameter modification response message is a parameter modification response indicating modification failed; or initiate a new parameter modification request according to a cause value returned from the target cell if the parameter modification response message is a parameter modification response indicating modification failed.

A non-transitory machine-readable medium is provided in another aspect of the present invention, and the non-transitory machine-readable medium have stored thereon, a computer program comprising at least one code section for distributing data, and the at least one code section is executable by a machine for causing the machine to perform acts of: acquiring information of load of a current cell and information of load of at least one adjacent cell; determining a target cell in which a mobility parameter needs to be modified according to the information of the load of the current cell and the information of the load of the at least one adjacent cell, wherein the target cell is one of the at least one adjacent cell; sending a parameter modification request to the target cell; receiving a parameter modification response message returned by the target cell; modifying parameters of the current cell according to content of the parameter modification request if the parameter modification response message is a parameter modification response indicating modification successful; and abandoning a current modification of the current cell, or initiating a new parameter modification request according to a cause value returned from the target cell if the parameter modification response message is a parameter modification response indicating modification failed.

With the embodiments of the present invention, defects in current standards can be remedied, and the information of the load exchange process and parameter modification process can be perfected, so as to better implement the LB solution in a network and then improve the communication quality of the network.

DESCRIPTION OF EMBODIMENTS

Figure 1:
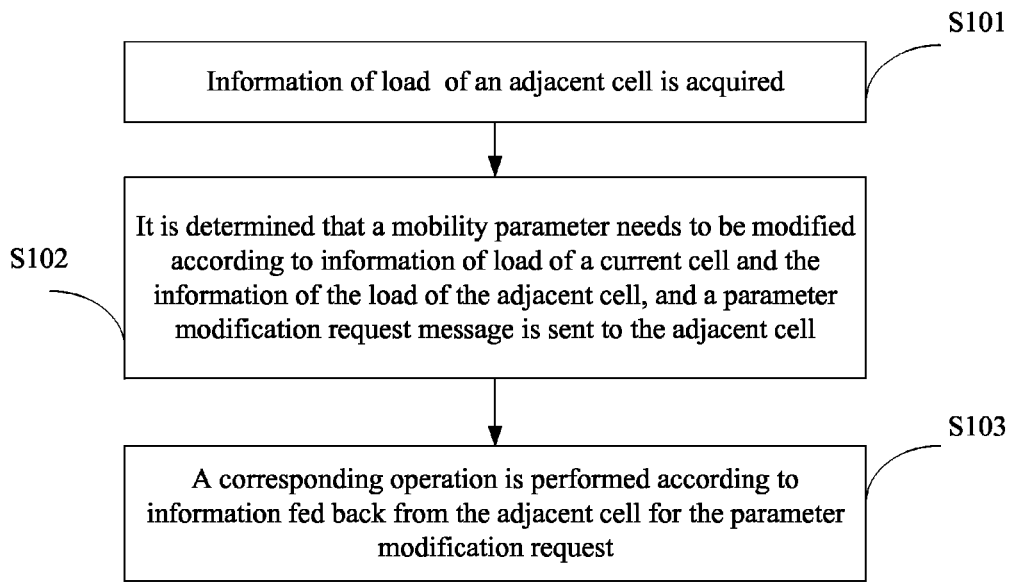
FIG. 1 is a schematic flow chart of a cell load balancing method according to an embodiment of the present invention.

Referring to FIG. 1, it is a schematic flow chart of a cell load balancing method according to an embodiment of the present invention, which may include the following steps.

In S101, information of load of an adjacent cell is acquired.

For example, the information of the load of the adjacent cell is acquired by a cell load balancing device. The cell load balancing device may be a functional entity located inside an evolved Node B (eNB), the eNB, or an entity independent of the eNB. The cell load balancing device may acquire the information of the load of the adjacent cell from an eNB of the adjacent cell.

In S102, it is determined that a mobility parameter needs to be modified according to the information of the load of a current cell and the information of the load of the adjacent cell, and a parameter modification request message is sent to the adjacent cell.

In S103, a corresponding operation is performed according to information fed back from the adjacent cell for the parameter modification request.

The mobility parameter includes, but is not limited to, at least one of a cell handover parameter and a cell reselection parameter.

In another embodiment of the present invention, the cell load balancing device further acquires resource use information of the current cell at any time of, for example, before, after, or while, acquiring the information of the load of the adjacent cell; and calculates a load of the current cell according to the resource use information of the current cell.

With the method according to the embodiments of the present invention, an LB solution in an SON network can be implemented, thereby increasing a capacity of the network, improving a success rate of user access, and reducing an access delay.

The embodiments of the present invention are introduced in detail in the following in three aspects, that is, load calculation, information of load exchange, and mobility parameter modification.

Cell Load Calculation

In the embodiments of the present invention, resource use information includes use information of air interface resources, transmission resources, and hardware resources. The use information of the air interface resource may be represented by one of a PRB use rate and a number of minimum service units; the use information of the transmission resource may be represented by one of a bandwidth use rate and a use status of the transmission resource; and the use information of the hardware resource may be represented by one of a use rate of a hardware resource processing capacity and a use status of the hardware resource.

For example, a cell load is calculated by a cell load measuring device. The cell load measuring device may be a functional entity located inside an eNB, the eNB, or an entity independent of the eNB.

Scenarios in which an air interface resource load of a cell is calculated according to air interface resource usage are introduced in the following.

First, an air interface load of a cell is calculated according to a PRB use rate.

The estimation of a cell load may be divided into the following four parts:
1) a load of guaranteed bit rate (GBR) services;
2) a load of non-GBR services;
3) a load of signaling bearers; and
4) a load of common channels.

Since GBR services, signaling bearers, and common channels must satisfy guaranteed rates, and thus have relatively fixed rates and occupy relatively fixed PRBs. For these services, contributions of the services to a system load can be described with the PRB use rate directly if the cell load is calculated.

For non-GBR services, since their rate is variable and may be reduced to 0 at certain moments, a contribution of the non-GBR services to the system load cannot be described with the PRB use rate directly if the cell load is calculated. The PRB use rate of the non-GBR services can be configured to describe their contributions to the system load only after being processed.

Therefore, the cell load includes the processed PRB use rate of non-GBR services, a PRB use rate of GBR services, a PRB use rate of signaling bearers, and a PRB use rate of common channels.

Figure 2:
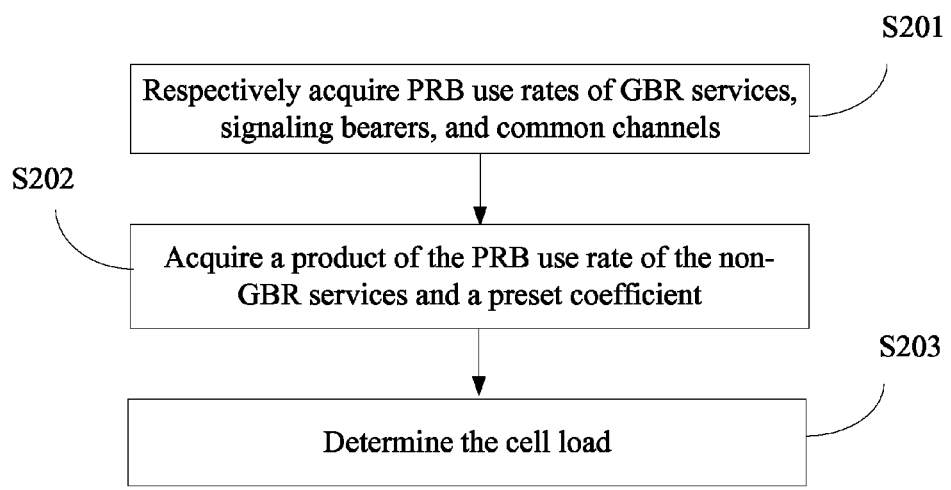
FIG. 2 is a schematic flow chart of a method for calculating an air interface load of a cell according to a physical resource block (PRB) use rate according to another embodiment of the present invention.

Referring to FIG. 2, it is a schematic flow chart of a method for calculating an air interface load of a cell according to a PRB use rate according to another embodiment of the present invention.

In S201, PRB use rates of GBR services, non-GBR services, signaling bearers, and common channels are respectively acquired.

For example, if the cell load balancing device is an entity independent of an eNB, the cell load balancing device may acquire the information from an eNB of a current cell.

In S202, the PRB use rate of the non-GBR services is processed.

In S203, the cell load is determined.

For example, the PRB use rate of the non-GBR services may be processed according to one of the following three methods.

1. The influence of the non-GBR services on the system load is not calculated.

Since the rate of the non-GBR service is variable, that is, resources occupied by non-GBR may be assigned to other higher priority services in case of system resource deficiency, in some scenarios, PRB resources occupied by the non-GBR services may be 0. Here, the cell load may be calculated based on the following formula:

Cell load=PRB use rate of GBR services+PRB use rate of signaling bearers+PRB use rate of common channels (1)

2. A load of the non-GBR services is calculated according to a minimum guaranteed rate.

A minimum guaranteed rate is respectively defined for non-GBR services according to different priorities of QCIs (QoS Class Identifiers). Here, the minimum guaranteed rate is a minimum rate satisfying quality of experience (QoE). QCIs corresponding to different non-GBR services are different, and a minimum guaranteed rate of a service corresponding to each QCI may be defined with reference to QoS requirements of each QCI service. For example, a minimum guaranteed rate of a non-GBR service having the QCI of 5 may be defined as 20K, a minimum guaranteed rate of a non-GBR service having a QCI of 6 is defined as 15K, a minimum guaranteed rate of a non-GBR service having a QCI of 7 is defined as 10K, a minimum guaranteed rate of a non-GBR service having a QCI of 8 is defined as 5K, and a minimum guaranteed rate of a non-GBR service having a QCI of 9 is defined as 2K.

1) A load proportion factor of non-GBR services may be calculated based on the following formula:

Load proportion factor of non-GBR services=minimum guaranteed rate/average rate (2)

Here, for the processing on the PRB use rate of the non-GBR services, a load of the non-GBR services is acquired by performing a calculation based on the following formula:

Load of non-GBR services=PRB use rate of non-GBR services*load proportion factor of non-GBR services (3)

The minimum guaranteed rate and the average rate in the method may be a minimum guaranteed rate and an average rate of different QCI services in the non-GBR services, or a minimum guaranteed rate and an average rate of the non-GBR services.

The cell load may be acquired by performing a calculation according to the following formula:

$$\text{Cell load} = PRB \text{ use rate of } GBR \text{ services} + \quad (4)$$

$$PRB \text{ use rate of signaling bearers} +$$

-continued $$PRB \text{ use rate of common channels} + \sum_{x=5}^{9} (PRB \text{ use rate}$$

$$\text{of } QCIx \text{ service} * \text{load proportion factor of } QCIx)$$

In another embodiment of the present invention, the cell load may also be acquired based on another formula:

Cell load=PRB use rate of GBR services+PRB use rate of signaling bearers+PRB use rate of common channels+PRB use rate of non-GBR services*load proportion factor (5)

2) The contribution of the non-GBR services to the cell load is calculated with PRB use rate of a service having the minimum guaranteed rate in the non-GBR services, and the minimum guaranteed rate may be a minimum guaranteed rate of the non-GBR services, then, for the processing on the PRB use rate of the non-GBR services, a load of the non-GBR services is acquired by performing a calculation based on the following formula:

Load of non-GBR services=PRB use rate of service having minimum guaranteed rate in non-GBR services*number of services in non-GBR services (6)

In another embodiment of the present invention, the minimum guaranteed rate are minimum guaranteed rates of different QCI services, and thus a preset coefficient is a number of services of the QCI services, then, for the processing on the PRB use rate of the non-GBR service, a load of the non-GBR services is acquired by performing a calculation based on the following formula:

$$\text{Load of non-}GBR \text{ services} = \quad (7)$$

$$\sum_{x=5}^{9} (PRB \text{ use rate of service having minimum}$$

$$\text{guaranteed rate in non-}GBR \text{ services of } QCIx *$$

$$\text{number of services in non-}GBR \text{ services of } QCIx)$$

Then, the cell load can be acquired by performing a calculation based on the following formula:

Cell load=PRB use rate of GBR services+PRB use rate of signaling bearers+PRB use rate of common channels+PRB use rate of service having minimum guaranteed rate in non-GBR services*number of services in non-GBR services (8)

In another embodiment of the present invention, the cell load may also be acquired by performing a calculation based on the following another formula:

$$\text{Cell load} = PRB \text{ use rate of } GBR \text{ services} + \quad (9)$$

$$PRB \text{ use rate of signaling bearers} +$$

$$PRB \text{ use rate of common channels} +$$

$$\sum_{x=5}^{9} (PRB \text{ use rate of service having minimum}$$

$$\text{guaranteed rate in non-}GBR \text{ services of } QCIx *$$

$$\text{number of services in non-}GBR \text{ services of } QCIx)$$

In another embodiment of the present invention, the minimum guaranteed rates here may also be the same for different QCIs.

3. The load of the non-GBR services is calculated with reference to a prioritized bit rate (PBR).

The current 3GPP protocol defines PBR for uplink rate control of non-GBR services, so that a user equipment (UE) determines priorities of resource scheduling of radio bearers (RBs) according to the PBR.

In the embodiment of the present invention, a load of non-GBR services may be calculated according to the PBR. A downlink PBR is defined with reference to the definition of an uplink PBR. A method similar to the method for calculation according to the minimum guaranteed rate may be used if calculating the load of the non-GBR services, as long as the minimum guaranteed rates of different QCI services are replaced by PBR rates corresponding to the QCI services, and the specific calculation method will not be described here again.

In the various solutions for calculating a cell load according to a PRB use rate according to the embodiments of the present invention, it is the most important to provide a reasonable calculation for the PRB use rate of non-GBR services, so as to guarantee the acquisition of reasonable total PRB use rate and finally calculate the cell load accurately.

Second, an air interface load of a cell is calculated according to a number of minimum service units.

Figure 3:
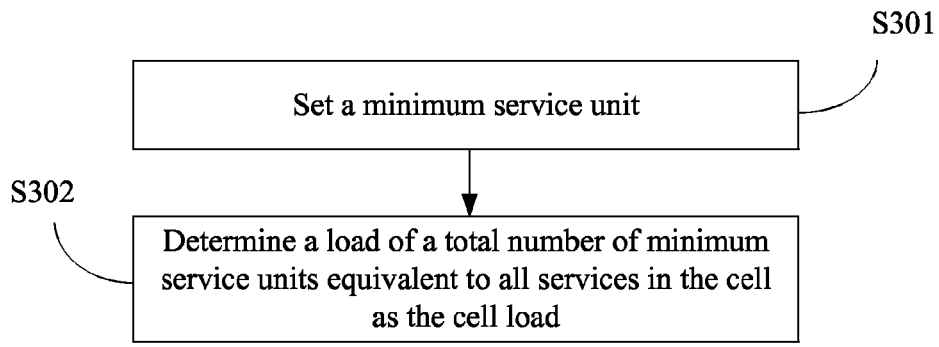
FIG. 3 is a schematic flow chart of a method for calculating an air interface load of a cell according to a number of minimum service units according to another embodiment of the present invention.

Referring to FIG. 3, it is a schematic flow chart of a method for determining a resource usage and calculating a cell load according to a number of minimum service units according to another embodiment of the present invention.

In S301, a minimum service unit is set.

In a system, a minimum service unit is defined. For example, in the LTE, a Voice Over IP (VOIP) service may be defined as a minimum service unit, or a signaling may be defined as a minimum service unit.

In S302, a load of a total number of minimum service units equivalent to all services in the cell is determined as the cell load.

For example, a proportional relation between resources required by each type of service and resources occupied by minimum service units is saved in service attributes of different service types, and the cell load is calculated according to the number of the minimum service units of the services in the cell. For example, if a service having a QCI of 5 is equivalent to 5 minimum service units, a load of the service having the QCI of 5 on the system is a load of the 5 minimum service units, and then, the cell load is equal to the load of the total number of minimum service units equivalent to all services in the cell.

Resources actually occupied by GBR services are substantially consistent with resources occupied by the total number of minimum service units defined in service attributes; the number of minimum service units corresponding to non-GBR services is the minimum number satisfying the QoS.

In this embodiment, the method using minimum service units can be configured to calculate not only an air interface load but also hardware resource consumption of an eNB.

The solution for calculating the cell load according to the number of minimum service units in this embodiment can improve the accuracy of calculating the cell load.

In another embodiment of the present invention, the load of the system is measured according to assignable resource (remaining capacity) information of the cell.

Different cells have different capacities, so that the remaining capacity of the cell, that is, the condition of resources that the cell can further provide, cannot be reflected by only the resource occupancy. Therefore, the remaining capacity information of the cell should also be considered in the access of a new user. The remaining capacity of the cell is the condition of resources that the cell can assign to the new user.

Since the rate of non-GBR services is variable, that is, resources occupied by the non-GBR services may be assigned to other services in some scenarios, the remaining capacity of the cell is calculated as idle resources of the cell plus resources that can be assigned to other users in the case that the current service QoE is satisfied in resources that have been assigned to the non-GBR services. The QoE here may be described with reference to the minimum guaranteed rate.

Third, an air interface load of a cell is calculated according to priorities of QCIs of service types supported by the cell.

Figure 4:
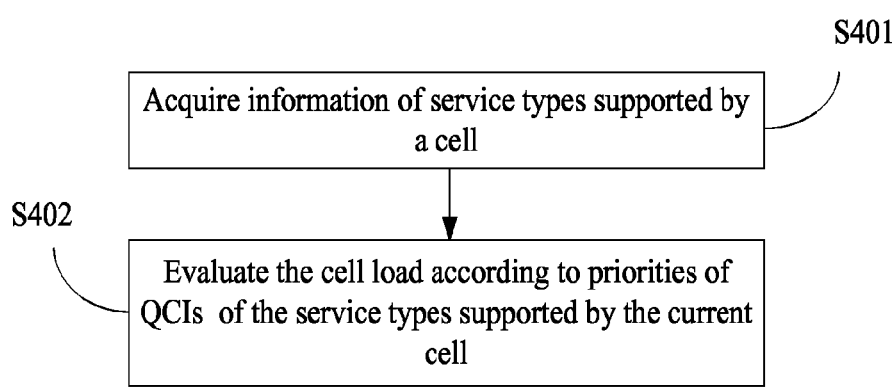
FIG. 4 is a schematic flow chart of a method for calculating an air interface load of a cell according to priorities of QCIs of services according to another embodiment of the present invention.

Referring to FIG. 4, it is a schematic flow chart of a method for calculating a cell load according to priorities of QCIs of services according to another embodiment of the present invention.

In S401, information of service types supported by a current cell is acquired.

For example, if the cell load balancing device is an entity independent of an eNB, the cell load balancing device may acquire the information of the service types supported by the current cell from an eNB of the current cell.

In S402, the cell load is calculated according to the priorities of QCIs of the service types supported by the current cell.

Different services have different QCI levels, and different QCI levels have different priorities. If assigning resources, the network gives priority to services of QCI levels having higher priorities, that is, assigns resources to the services preferentially. If resources of the cell are limited, priorities of QCI levels of services supported by the cell are different, that is, the priorities of QCI levels of the services supported by the cell reflect the resource condition of the cell. Therefore, the cell load can be calculated according to priorities of QCI levels supported by the cell.

Figure 5:
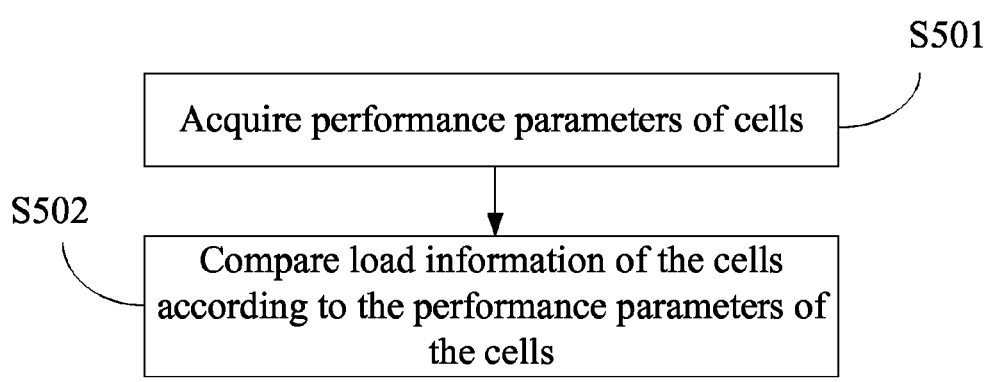
FIG. 5 is a schematic flow chart of a method for calculating an air interface load of a cell according to performance parameters of the cell according to another embodiment of the present invention.

Referring to FIG. 5, it is a schematic flow chart of a method for calculating an air interface load of a cell according to performance parameters of the cell according to another embodiment of the present invention.

In S501, performance parameters of a current cell are acquired.

For example, if the cell load balancing device is an entity independent of an eNB, the cell load balancing device may acquire the performance parameters of the current cell from an eNB of the current cell.

In S502, the information of the load of the current cell is calculated according to the performance parameters of the current cell.

The load status of the system is finally reflected by the performance of the system. Thus, the cell load may be calculated based on performance data of the cell. The performance data that can be used here may include, but is not limited to, QoS-related data, for example, delay and block error ratio (BLER), and performance statistics-related data, for example, access success rate, call drop rate, and handover success rate. For example, if the QoS performance of cell A is poorer than that of cell B or the access success rate of cell A is lower than that of cell B, the cell load A is higher than that of cell B.

For transmission resources and hardware resources, the load may be described by the following two methods.

1) For the hardware resources and the transmission resources, the load may be indicated by employing resource use proportions respectively.

For example, for the transmission resources, the resource use information may be described according to a proportion of a used bandwidth in a total bandwidth; for the hardware resources, the resource use information may be described according to a proportion of a used hardware resource processing capacity in a total hardware resource processing capacity of the system.

2) For the transmission resources and the hardware resources, since they are usually not a bottleneck of the system performance, only the status of the two types of resources needs to be considered.

For example, the status of resources may include an overload status and a non-overload status.

The overload status may indicate that a resource load is heavy, for example, the resource load of the cell exceeds a preset threshold; here, the cell cannot share services of other cells.

The non-overload status may indicate that a resource load is light or normal, for example, the resource load of the cell is below a preset threshold; here, the cell can share loads of other cells.

In another embodiment of the present invention, the status of resources may further include an overload status, a normal status, and a light load status.

The overload status may indicate that a resource load is very heavy, for example, the resource load of the cell exceeds a preset threshold, for example, exceeds a maximum value of the preset threshold; here, the cell cannot share services of any other cell.

The normal status may indicate that a resource load is normal, for example, the resource load of the cell is within a preset threshold interval, and the cell can share services of other overloaded cells.

The light load status may indicate that a resource load is light, for example, the resource load of the cell is below a preset threshold, for example, less than a minimum value of the preset threshold, and the cell can share services of any other cell.

In another embodiment of the present invention, the status of resources may further include an overload status, a heavy load status, a normal status, and a light load status.

The overload status may indicate that a resource load is very heavy, for example, the resource load of the cell exceeds a preset threshold, for example, exceeds a maximum value of the preset threshold, and the cell needs to request other cells to share services.

The heavy load status may indicate that a resource load is heavy, for example, the resource load of the cell is within a preset threshold interval, and the cell cannot share services of any other cell.

The normal status may indicate that a resource load is normal, for example, the resource load of the cell is within a preset threshold interval, but the cell can share services of any other cell, for example, services of other overloaded and heavy loaded cells.

The light load status can indicate that a resource load is light, for example, the resource load of the cell is below a preset threshold, for example, less than a minimum value of the preset threshold, and the cell can share services of any other cell.

To sum up, the consideration of loads of the three types of resources includes respective considerations of the load status of air interface resources, transmission resources, and hardware resources of the cell. A synthetic load of the cell is considered by taking loads of air interface resources, transmission resources, and hardware resources of the cell as an entirety. If the synthetic load of the cell is calculated, a contribution of each type of resources to the synthetic load is calculated according to a certain proportion coefficient. For example, the synthetic load of the cell may be calculated based on the following formula:

$$\text{Synthetic load of cell} = \text{air interface resource load} * \text{air interface resource coefficient} + \text{transmission resource load} * \text{transmission resource coefficient} + \text{hardware resource load} * \text{hardware resource coefficient} \quad (10)$$

Inter-Cell Information of Load Exchange

In another embodiment of the present invention, a method for information exchange between eNBs is described for reducing the flow of information exchange and improving the efficiency of information exchange.

If a load of a source cell reaches a preset threshold, a source eNB (S_eNB) needs to know a load of a target eNB (T_eNB). The preset threshold may be delivered by an operation, administration, and maintenance (OAM) or set at initial configuration. The S_eNB sends a resource status request message to the T_eNB. The resource status request message indicates a mode and a condition for the target cell to report information of load. Here, the information of the load exchange may be triggered if the load of any type of resources reaches a preset threshold or a synthetic load of the cell reaches a preset threshold.

1) Event-Based Reporting

Figure 6:
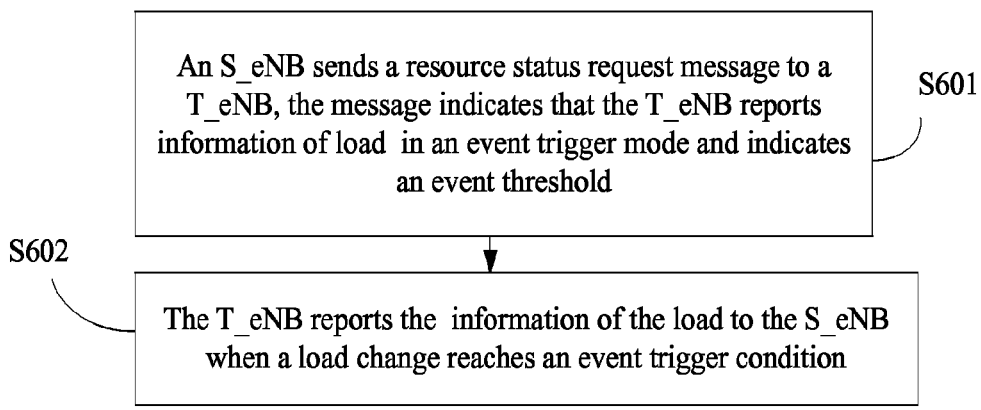
FIG. 6 is a schematic flow chart illustrating information of load exchange performed in an event trigger mode according to another embodiment of the present invention.

Referring to FIG. 6, it is a schematic flow chart illustrating information of load exchange performed in an event trigger mode according to another embodiment of the present invention.

In S601, an S_eNB sends a resource status request message to a T_eNB. The resource status request message indicates that the T_eNB reports information of load in an event trigger mode and indicates an event threshold.

In S602, the T_eNB reports the information of the load to the S_eNB, if a load change reaches an event trigger condition.

For example, if sending the resource status request message, the S_eNB of the source cell indicates in the report mode that reporting is made in the event trigger mode and indicates the event threshold. After receiving the resource status request message, the T_eNB firstly reports current load status information of a relevant cell, and then reports new information of load of the relevant cell to the S_eNB if the load change of the relevant cell satisfies the event trigger condition according to the indicated event threshold.

2) Period and Event-Based Reporting

Figure 7:
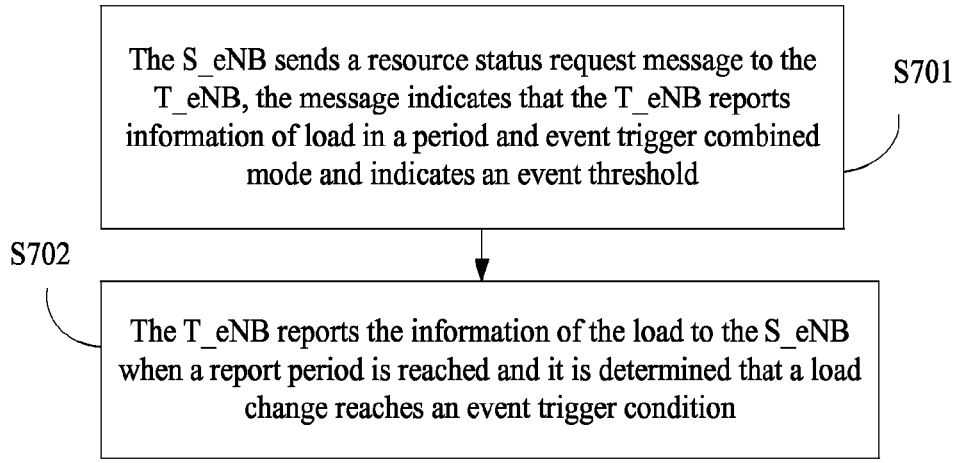
FIG. 7 is a schematic flow chart illustrating information of load exchange performed in a period and event trigger combined mode according to another embodiment of the present invention.

Referring to FIG. 7, it is a schematic flow chart illustrating information of load exchange performed in a period and event trigger combined mode according to another embodiment of the present invention.

In S701, an S_eNB sends a resource status request message to a T_eNB, the resource status request message indicates that the T_eNB reports information of load in a period and event trigger combined mode and indicates an event threshold.

In S702, the T_eNB reports the information of the load to the S_eNB if a report period is reached and it is determined that a load change reaches an event trigger condition.

For example, the information of the load may include information of load of air interface, information of load of transmission resource, and information of load of hardware resource, or synthetic information of load. The event trigger includes triggering event reporting if a load change of a target cell exceeds a certain threshold.

For example, the S_eNB of the source cell indicates in a report mode that reporting is made in a period and event combined mode and indicates the event threshold if sending the resource status request message. After receiving the resource status request message, the T_eNB firstly reports current load status information of a relevant cell, compares the current load status with a condition set in an event report before the next period arrives, and if the condition is satisfied, reports the information of the load to the source cell; otherwise, does not perform the reporting.

The following modifications need to be made to an existing resource status request message according to the method.

① A Report Mode option is added to indicate a report mode of the T_eNB. The Report Mode may include period reporting, event reporting, and period and event combined reporting modes.

② Optionally, an Event Threshold is added. If the Report Mode is event reporting or period and event combined reporting, the value is valid, and the value may be 0 by default.

Figure 8:
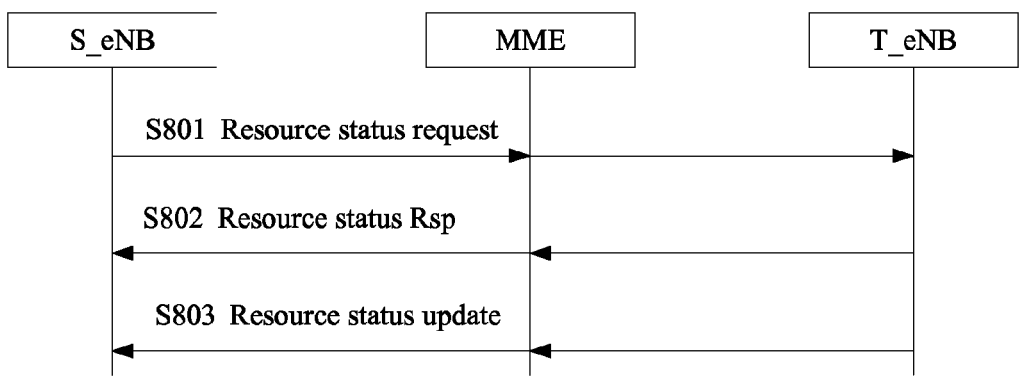
FIG. 8 is a schematic flow chart illustrating information of load exchange performed by a mobility management entity (MME) according to another embodiment of the present invention.

Referring to FIG. 8, it is a schematic flow chart illustrating information of load exchange performed in the case that an X2 interface is absent or unavailable according to another embodiment of the present invention.

In S801, an S_eNB sends a resource status request message to an MME, and the MME forwards the resource status request message to a T_eNB.

In S802, the T_eNB sends a resource status response (Rsp) message to the MME, and the MME sends the resource status Rsp message to the S_eNB.

In S803, the T_eNB sends a resource status update message to the MME, and the MME sends the resource status update message to the S_eNB.

In this embodiment, if an X2 interface between the S_eNB and the T_eNB is absent or unavailable, the S_eNB of the source cell sends the resource status request information to a connected MME through an S1 interface.

The resource status request information may have in the following two modes.

1) For example, a T_eNB identifier (ID) is added to the resource status request message, the MME transparent transmits the resource status request message to the T_eNB after receiving the resource status request message.

2) For example, the MME knows the T_eNB ID according to Global Cell ID information in the resource status request message, and forwards the resource status request message to the T_eNB according to the T_eNB ID.

For example, the forwarding of the resource status request message to the T_eNB by the MME may have the following several scenarios.

1) If an S1 connection exists between the T_eNB and the MME, the MME directly forwards the resource status request message to the T_eNB.

2) If no S1 connection exists between the T_eNB and the MME, the MME searches for an MME connected to the T_eNB according to the T_eNB ID, and forwards the resource status request message to the MME connected to the T_eNB through an S3 interface between the MMEs, and the target MME forwards the resource status request message to the T_eNB.

In another embodiment of the present invention, if the S_eNB intends to acquire information of load of a cell in a different system, the S_eNB of the source cell sends resource status request information to a connected MME through an S1 interface. A target node ID is added in the resource status request message, and the target node ID includes a radio network controller (RNC) ID and base station controller (BSC) ID or includes a target cell ID. The MME forwards the resource status request message to a core network node in the different system connected to MME after receiving the resource status request message. For example, the core network node includes a serving GPRS support node (SGSN). The core network node in the target system searches for a corresponding target node according to the target node ID in the resource status request message. The target node sends exchanging information of load to the S_eNB according to a condition in the resource status request message. For example, the process may be shown in FIG. 9.

Figure 9:
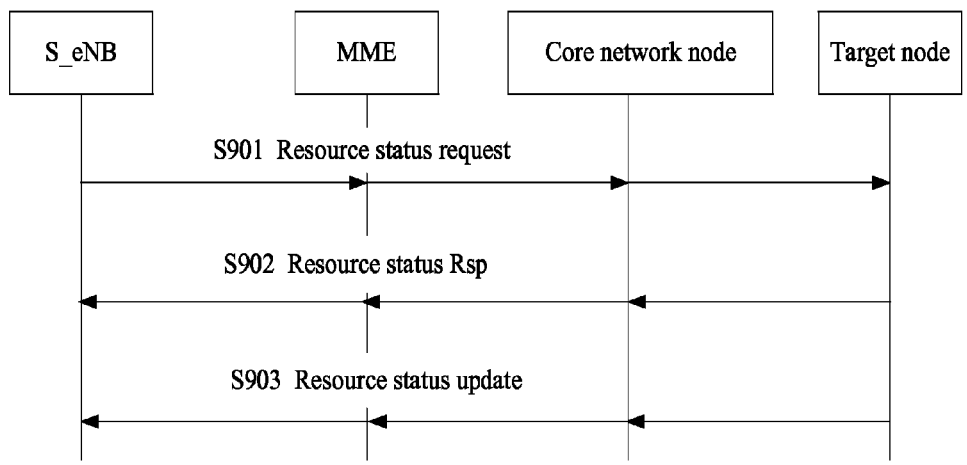
FIG. 9 is a schematic flow chart illustrating information of load exchange performed by another network node according to another embodiment of the present invention.

Referring to FIG. 9, it is a schematic flow chart illustrating information of load exchange performed between wireless nodes in different systems by a core network node according to another embodiment of the present invention.

In S901, a resource status request message initiated by an S_eNB reaches a target node by an MME and a first core network node to which the target node belongs.

In S902, a resource status Rsp message initiated by the target node reaches the S_eNB by the first core network node and the MME.

In S903, a resource status update message initiated by the target node reaches the S_eNB by the first core network node and the MME.

In another embodiment of the present invention, if a source network node intends to acquire information of load of an adjacent node cell, the source network node sends a resource status query message of the adjacent node cell to an element management system (EMS) to which the current node belongs, the EMS queries a target network node in network nodes managed by the EMS according to ID information of the target network node after receiving the query message; or queries a target network node from an EMS to which the target network node belongs through a horizontal interface between EMSs; or queries a target network node from a network management system (NMS) through a northbound interface (Itf-N). One of the source EMS, the target EMS, and the NMS returns information of load of a cell of the target network node to the source network node after receiving the resource status query message.

The process of load balancing decision between cells may be described in the following.

An S_eNB in a source cell makes decision according to the following principles after acquiring information of load of an adjacent cell.

Selection of a load balancing object (that is, an adjacent cell): the S_eNB in the source cell acquires the load balancing object, that is, a set of candidate target cells, by taking statistics of performance parameters of the source cell and the adjacent cells. Here, the performance parameters include the number of handovers between the source cell and the target cells, and a handover success rate.

The loads of the source cell and the adjacent cell may be considered in the following two ways.

1) Load status of air interface resources, transmission resources, and hardware resources of the source cell and the adjacent cell are respectively considered, and if any type of the resources is in an overload status, load balancing of the overloaded resources is considered firstly; if no resource is in the overload status, only load balancing of air interface resources is considered.

2) Only synthetic loads of the cells are considered, and load balancing decision is made according to the synthetic loads of the source cell and the adjacent cell.

For example, the load balancing means sharing part of services of a cell under heavy load by a cell under light load through a preset measure. The preset measure includes a handover caused by mobility parameter modification and a network-triggered handover.

For example, if a difference between a load of the current cell and a load of a candidate target cell exceeds a preset threshold, it is determined that the candidate target cell is the target cell for mobility parameter modification.

The process of mobility parameter modification between cells may be described in the following.

Figure 10:
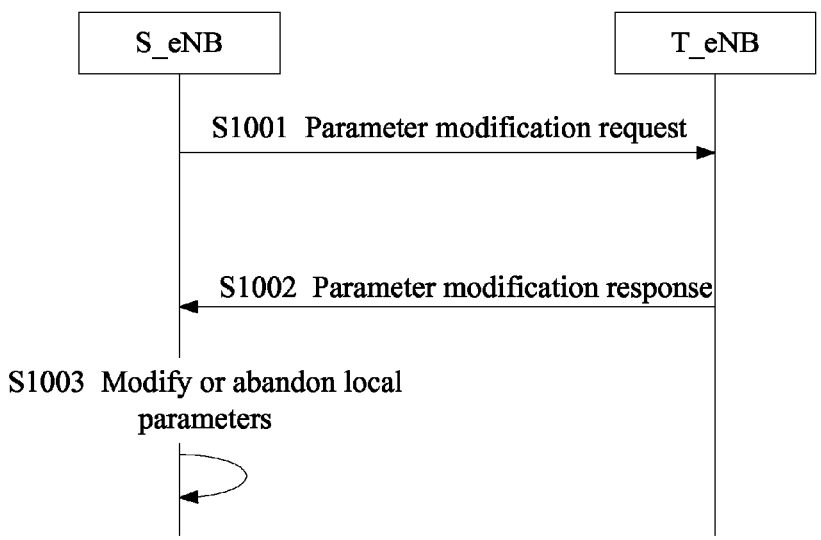
FIG. 10 is a schematic flow chart of a method for modifying a relevant mobility parameter in a process of information of load exchange according to another embodiment of the present invention.

Referring to FIG. 10, it is a schematic flow chart illustrating mobility parameter modification between cells according to another embodiment of the present invention.

In S1001, an S_eNB sends a parameter modification request message to a target node according to a result of a load balancing policy. The parameter modification request message may be sent through one of an X2 interface, an S1 interface in LTE and an interface between different systems.

In S1002, the target node decides locally whether local parameter modification can be made according to content in the request message after receiving the parameter modification request message.

If the modification can be made, a parameter modification response message indicating Modification Successful is returned, and local parameters are modified; if the local policy of the target node cannot be modified according to the content in the request message, a parameter modification response message is returned, which indicates Modification Failed and carries a corresponding cause value and a range of modifiable parameters.

In S1003, the S_eNB receives the parameter modification response message returned by the target node, and if the parameter modification response message is a parameter modification response indicating Modification Successful, modifies local parameters according to the content of the parameter modification request; if the parameter modification response message is a parameter modification response indicating Modification Failed, abandons the current modification, or initiates a new parameter modification request according to the returned cause value.

As can be known from the description of the above embodiment, after information of load of a current cell and information of load of an adjacent cell are known, the process of mobility parameter modification between the cells is performed, so as to implement balancing of cell information of load.

A cell load balancing device is further provided in another embodiment of the present invention. The cell load balancing device may be a functional entity located inside an eNB, the eNB, or a functional entity independent of the eNB, and may be implemented through software, hardware, or software plus hardware.

Figure 11:
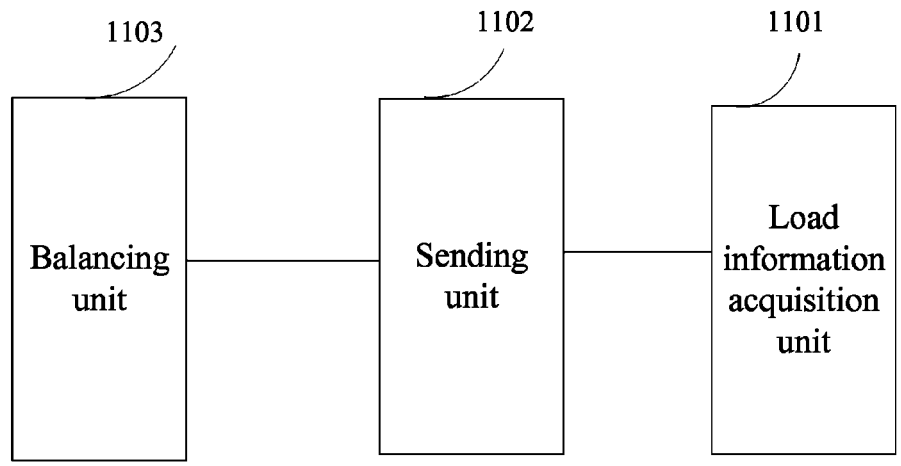
FIG. 11 is a schematic structural view of a cell load balancing device according to another embodiment of the present invention.

With reference to FIG. 11, the cell load balancing device may include a load information acquisition unit 1101, a sending unit 1102, and a balancing unit 1103.

The load information acquisition unit 1101 is configured to acquire information of load of a current cell, and acquire information of load of an adjacent cell according to the information of the load of the current cell.

The sending unit 1102 is configured to determine whether a mobility parameter needs to be modified according to the information of the load of the current cell and the information of the load of the adjacent cell acquired by the load information acquisition unit 1101, and send a parameter modification request message to the adjacent cell if determining that the mobility parameter needs to be modified.

The balancing unit 1103 is configured to perform a corresponding operation according to received information indicating whether the parameter is successfully modified and fed back from the adjacent cell. For example, particularly, if the balancing unit 1103 receives a parameter modification response indicating Modification Successful, the balancing unit 1103 modifies local parameters according to the request content; if the balancing unit 1103 receives a parameter modification response indicating Modification Failed, the balancing unit 1103 abandons the current modification, or initiates a new parameter modification request according to a returned cause value.

Optionally, the load information acquisition unit 1101 is configured to acquire information of load of the current cell. The information of load of the current cell includes air interface resources, hardware resources, and transmission resources. The load information acquisition unit 1101 is configured to acquire the information of the load of the adjacent cell if a load of the air interface resources, the hardware resources, or the transmission resources exceeds a first preset threshold. Alternatively, the load information acquisition unit 1101 is configured to acquire the information of the load of the adjacent cell according to a synthetic load of the cell, for example, configured to calculate a cell load to be equal to a sum of a product of an air interface resource load and an air interface resource coefficient, a product of a transmission resource load and a transmission resource coefficient, and a product of a hardware resource load and a hardware resource coefficient, and acquire the information of the load of the adjacent cell if the cell load exceeds a second preset threshold.

The sending unit 1102 is further configured to send a resource status request message including an indication parameter to the adjacent cell. The indication parameter is configured to indicate that the adjacent cell reports the information of the load in an event trigger mode or indicates that the adjacent cell reports the information of the load in a period and event trigger combined mode. If an interface exists between a node of the current cell and a node of the adjacent cell, the sending unit 1102 directly sends the resource status request message to the node of the adjacent cell; if the interface is absent or unavailable, the sending unit 1102 sends the resource status request message to one of a core network node, EMS and an NMS to which the current cell belongs, and then one of the core network node, the EMS, and the NMS forwards the resource status request message to the node of the adjacent cell.

A cell load measuring device is further provided in another embodiment of the present invention. The cell load balancing device may be a functional entity located inside an eNB, the eNB, or a functional entity independent of the eNB, and may be implemented through one software, hardware, and software plus hardware.

Figure 12:
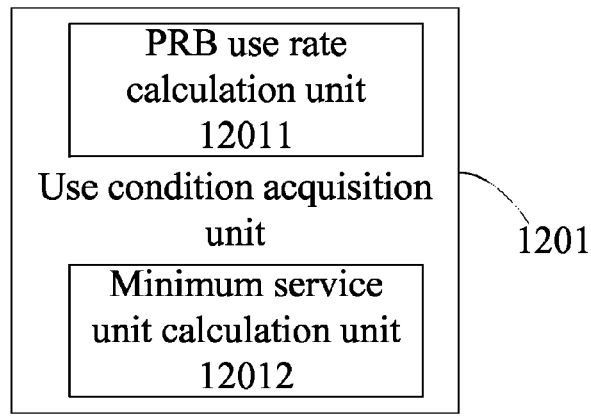
FIG. 12 is a schematic structural view of a cell load measuring device according to another embodiment of the present invention.

Referring to FIG. 12, the cell load measuring device may include a use information acquisition unit 1201.

The use information acquisition unit 1201 is configured to acquire a resource load of the cell according to one of a resource usage of the cell, remaining air interface resources of the cell, priorities of QCIs of service types supported by the cell, and performance parameters of the cell.

In another embodiment of the present invention, the use information acquisition unit 1201 includes a PRB use rate calculation unit 12011, configured to process a PRB use rate of non-GBR services and calculate a resource load of the cell, for example, a resource load of the current cell. The resource load of the cell is a sum of the processed PRB use rate of non-GBR services, a PRB use rate of GBR services, a PRB use rate of signaling bearers, and a PRB use rate of common channels.

In another embodiment of the present invention, the use information acquisition unit 1201 includes a minimum service unit calculation unit 12012, configured to set a minimum service unit and calculate a resource load of the cell, for example, a resource load of the current cell. The resource load of the cell is a total number of minimum service units equivalent to all services in the cell. For example, the minimum service unit calculation unit 12012 is configured to determine PBRs satisfying a QoE as minimum guaranteed rates, determine uplink PBRs in the process of uplink rate control of a UE as PBRs of different QCIs, and process the PRB use rate of the non-GBR services according to one of the minimum guaranteed rates and the PBRs.

Particularly, the method for calculating the load of the current cell has been described in detail in the specific method embodiments, and will not be described herein again.

A cell load balancing system is further provided in an embodiment of the present invention, which includes a first cell node, a second cell node, and a cell load balancing device. The first cell node and the second cell node are respectively located in two adjacent cells, and the first cell node and the cell load balancing device are located in the same cell.

The cell load balancing device is configured to acquire information of load of a current cell from the first cell node, and acquire information of load of an adjacent cell from the second cell node; and send a parameter modification request to the second cell node if determining that a mobility parameter needs to be modified according to the acquired the information of the load of the current cell and the acquired the information of the load of the adjacent cell.

The second cell node modifies the mobility parameter of a current cell according to the parameter modification request sent from the cell load balancing device, and feeds information indicating whether the parameter is successfully modified back to the cell load balancing device.

The cell load balancing device is configured to modify the mobility parameter of the current cell according to the information indicating whether the parameter is successfully modified and fed back from the second cell node.

In another embodiment of the present invention

The cell load balancing device is further configured to acquire one of an air interface resource load, a hardware resource load, and a transmission resource load of the current cell from the first cell node, and acquire information of the adjacent cell according to one of the air interface resource load, the hardware resource load, and the transmission resource load of the current cell.

The cell load balancing device is further configured to acquire a synthetic load of the current cell from the first cell node, and acquire the information of the load of the adjacent cell according to the synthetic load of the current cell. The synthetic load of the current cell is acquired according to the air interface resource load, the hardware resource load, and the transmission resource load of the current cell.

In another embodiment of the present invention

The cell load balancing device is further configured to acquire a set of candidate target cells according to a handover-related performance parameter between the current cell and the adjacent cell, and if a difference between a load of a candidate target cell and a load of the current cell exceeds a preset threshold, determine that the candidate target cell is a target cell in which a mobility parameter needs to be modified, and send a parameter modification request message to the second cell node.

In another embodiment of the present invention

The load information acquisition unit is further configured to send a resource status request message to the second cell node, and is further configured to receive the information of the load sent from the second cell node.

The resource status request message carries an indication parameter. The indication parameter is configured to indicate that the adjacent cell reports the information of load if an event threshold is satisfied, or configured to indicate that the adjacent cell reports the information of the load if a report period is reached and an event threshold is satisfied.

With the solutions provided in the embodiments of the present invention, the defects in the current standards can be remedied, a load of a cell can be accurately calculated, and information of load exchange process and parameter modification process can be perfected, so as to better implement the LB solution in a network and then increase a capacity of the network, improve a success rate of user access, and reduce access delay.

Through the descriptions of the preceding embodiments, those skilled in the art may understand that the present invention may be implemented by hardware only or by software and a necessary universal hardware platform. However, in most scenarios, using software and a necessary universal hardware platform are preferred. Based on such understandings, all or part of the technical solution under the present invention that makes contributions to the prior art may be essentially embodied in the form of a software product. The software product may be stored in a storage medium. The software product includes a number of instructions that enable a computer device (personal computer, server, or network device) to execute the methods provided in the embodiments of the present invention. The storage medium may be any medium that is capable of storing program codes, such as a USB flash drive, a removable hard drive, a Read-Only Memory (ROM), a Random Access Memory (RAM), a magnetic disk, or a Compact Disk Read-Only Memory (CD-ROM).

In several embodiments provided in the present application, it should be understood that the disclosed system, device, and method may be implemented in other ways without going beyond the spirit and scope of the present application. The current embodiments are merely exemplary examples instead of being limitative, and the specific content provided thereby should not limit the objective of the present application. For example, the division of units is merely a division of logic functions, and other divisions may exist in actual implementation, for example, multiple units or components may be combined or integrated into another system, or some features may be omitted or not performed.

The device embodiments are merely exemplary. Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands. Persons of ordinary skill in the art can understand and implement the present invention without creative efforts.

Besides, the schematic views of the described system, device, and method as well as different embodiments may be combined or integrated with other systems, modules, technologies, or methods without going beyond the scope of the present application. Furthermore, the shown or discussed coupling or direct coupling or communication connection may be accomplished through some interfaces, and indirect coupling or communication connection between devices or units may be electrical, mechanical, or in other forms.

It should be noted that the above descriptions are merely preferred embodiments of the present invention, and those skilled in the art may make various improvements and refinements without departing from the spirit of the invention. All such modifications and refinements are intended to be covered by the present invention.

What is claimed is:

1. A cell load balancing method, comprising:
acquiring information of load of a current cell and information of load of at least one adjacent cell neighboring the current cell;
determining a target cell in which a mobility parameter needs to be modified according to the information of the load of the current cell and the information of the load of the at least one adjacent cell, wherein the target cell is one of the at least one adjacent cell;
sending a parameter modification request to the target cell;
receiving a parameter modification response message returned by the target cell;
modifying parameters of the current cell according to content of the parameter modification request if the parameter modification response message indicates parameter modification for the target cell is successful; and
abandoning a current modification of the current cell, or initiating a new parameter modification request according to a cause value returned from the target cell, if the parameter modification response message indicates parameter modification for the target cell failed.

2. The method according to claim 1, wherein the acquiring the information of the load of the at least one adjacent cell comprises one or more of:
acquiring the information of the load of the at least one adjacent cell according to one of an air interface resource load, a hardware resource load, and a transmission resource load of the current cell; or
acquiring a synthetic load of the current cell according to one or more of an air interface resource load, a hardware resource load, or a transmission resource load of the current cell, and acquiring the information of the load of the at least one adjacent cell according to the synthetic load of the current cell.

3. The method according to claim 2, wherein the acquiring the information of the load of the at least one adjacent cell according to one or more of the air interface resource load, the hardware resource load, or the transmission resource load of the current cell comprises one or more of:
performing information of load exchange with the at least one adjacent cell to acquire the information of the load of the at least one adjacent cell if a proportion of used air interface resources in total air interface resources of the current cell reaches a first preset threshold;
performing information of load exchange with the at least one adjacent cell to acquire the information of the load of the at least one adjacent cell if a proportion of a used hardware resource load in total hardware resources of the current cell reaches a second preset threshold;
performing information of load exchange with the at least one adjacent cell to acquire the information of the load of the at least one adjacent cell if a proportion of transmission resources in total transmission resources reaches a third preset threshold; or
performing information of load exchange with the at least one adjacent cell to acquire the information of the load of the at least one adjacent cell if one of the air interface resource load, the hardware resource load, and the transmission resource load of the current cell is in an overload status.

4. The method according to claim 2, wherein the synthetic load of the current cell is a sum of a product of the air interface resource load and a first preset coefficient, a product of the hardware resource load and a second preset coefficient, and a product of the transmission resource load and a third preset coefficient.

5. The method according to claim 1, wherein the determining the target cell in which the mobility parameter needs to be modified thereof comprises:
acquiring a set of candidate target cells according to a handover-related performance parameter between the current cell and the at least one adjacent cell; and
determining that a candidate target cell is the target cell in which the mobility parameter need to be modified thereof, if a difference between a load of the candidate target cell and a load of the current cell exceeds a preset threshold.

6. The method according to claim 1, wherein the acquiring the information of the load of the at least one adjacent cell comprises:
sending a resource status request message carrying an indication parameter to each of the at least one adjacent cell, wherein the indication parameter is configured to indicate that an adjacent cell reports which information of load if an event threshold of the adjacent cell is satisfied, or that an adjacent cell reports which information of load if a report period of the adjacent cell is reached and an event threshold of the adjacent cell is satisfied; and
receiving the information of the load sent from the adjacent cell.

7. The method according to claim 6, wherein the event threshold is that a change of a cell load satisfies a preset threshold value.

8. The method according to claim 6, wherein the sending the resource status request message to the at least one adjacent cell comprises one or more of:
transmitting the resource status request message through an interface with a node to which each of the at least one adjacent cell belongs to the each of the at least one adjacent cell respectively;
transmitting the resource status request message through a mobility management entity (MME) to which the current cell belongs to the at least one adjacent cell;
transmitting the resource status request message through a mobility management entity (MME) to which the current cell belongs and a core network entity to which each of the at least one adjacent cell belongs to the each of the at least one adjacent cell respectively; or
transmitting the resource status request message through one of an element management system (EMS) and a network management system (NMS) to the at least one adjacent cell.

9. The method according to claim 1, further comprising:
acquiring resource use information of the current cell; and
calculating load of the current cell according to the resource use information of the current cell.

10. The method according to claim 9, further comprising:
acquiring physical resource block (PRB) use rates of guaranteed bit rate (GBR) services, signaling bearers and common channels, and
wherein the calculating the load of the current cell is based on following formula if influence of non-GBR services on system load is not calculated:

load=PRB use rate of GBR services+PRB use rate of signaling bearers+PRB use rate of common channels.

11. The method according to claim 9, further comprising:
acquiring physical resource block (PRB) use rates of guaranteed bit rate (GBR) services, signaling bearers and common channels, and wherein the calculating the load of the current cell based on following formula if load of non-GBR services is calculated according to a minimum guaranteed rate:

$$load = \\ PRB \text{ use rate of } GBR \text{ services} + PRB \text{ use rate of signaling bearers} + \\ PRB \text{ use rate of common channels} + \\ \sum_{x=5}^{9}(PRB \text{ use rate of } QCIx \text{ service} * \text{load proportion factor of } QCIx);$$

wherein the QCI is a quality of service (QoS) class identifier.

12. The method according to claim 9, further comprising:
acquiring physical resource block (PRB) use rates of guaranteed bit rate (GBR) services, signaling bearers and common channels, and
wherein the calculating the load of the current cell based on following formula if load of non-GBR services is calculated according to a minimum guaranteed rate:

load=PRB use rate of GBR services+PRB use rate of signaling bearers+PRB use rate of common channels+PRB use rate of non-GBR services*load proportion factor.

13. The method according to claim 9, further comprising:
acquiring physical resource block (PRB) use rates of guaranteed bit rate (GBR) services, signaling bearers and common channels, and
wherein the calculating the load of the current cell based on following formula if load of non-GBR services is calculated according to a minimum guaranteed rate:

load=PRB use rate of GBR services+PRB use rate of signaling bearers+PRB use rate of common channels+PRB use rate of service having minimum guaranteed rate in non-GBR services*number of services in non-GBR services.

14. The method according to claim 9, further comprising:
acquiring physical resource block (PRB) use rates of guaranteed bit rate (GBR) services, signaling bearers and common channels, and
wherein the calculating the load of the current cell based on following formula if load of non-GBR services is calculated according to a minimum guaranteed rate:

$$load = \\ PRB \text{ use rate of } GBR \text{ services} + PRB \text{ use rate of signaling bearers} + \\ PRB \text{ use rate of common channels} + \\ \sum_{x=5}^{9}(PRB \text{ use rate of service having minimum} \\ \text{guaranteed rate in non-} GBR \text{ services of } QCIx * \\ \text{number of services in non-} GBR \text{ services of } QCIx);$$

wherein the QCI is a quality of service (QoS) class identifier.

15. The method according to claim 9, further comprising:
setting a minimum service unit, and
determining a load of a total number of minimum service units equivalent to all services in the cell as the load of the current cell.

16. The method according to claim 9, further comprising:
acquiring information of service types supported by the current cell, and
wherein the calculating the load of the current cell according to the resource use information of the current cell comprises:
calculating the load of the current cell according to priorities of quality of service (QoS) class identifiers (QCIs) of service types supported by the current cell.

17. The method according to claim 9, further comprising:
acquiring performance parameters of the current cell, and
wherein the calculating the load of the current cell according to the resource use information of the current cell comprises:
calculating the load of the current cell according to the performance parameters of the current cell.

18. The method according to claim 1, wherein the mobility parameter contains one or more of a cell handover parameter or a cell reselection parameter.

19. A cell load balancing device, comprising:
a processor, configured to acquire information of load of a current cell and information of load of at least one adjacent cell neighboring the current cell, and determine a target cell in which a mobility parameter needs to be modified according to the information of the load of the current cell and the information of the load of the at least one adjacent cell, wherein the target cell is one of the at least one adjacent cell;
a transmitter, configured to send a parameter modification request to the target cell if the mobility parameter of the target cell needs to be modified;
a receiver, configured to receive a parameter modification response message returned by the target cell;
the processor is further configured to modify parameters of the current cell according to content of the parameter modification request if the parameter modification response message indicates parameter modification for the target cell is successful; or
abandon a current modification of the current cell or initiate a new parameter modification request according to a cause value returned from the target cell, if the parameter modification response message indicates parameter modification for the target cell failed.

20. The device according to claim 19, wherein
the processor is further configured to acquire information of the load of the at least one adjacent cell according to one or more of an air interface resource load, a hardware resource load, ardor a transmission resource load of the current cell.

21. The device according to claim 20, wherein the processor is further configured to perform one or more of:
performing information of load exchange with the at least one adjacent cell to acquire the information of the load of the at least one adjacent cell if a proportion of used air interface resources in total air interface resources of the current cell reaches a first preset threshold;
performing information of load exchange with the at least one adjacent cell to acquire the information of the load of the at least one adjacent cell if a proportion of a used hardware resource load in total hardware resources of the current cell reaches a second preset threshold;
performing information of load exchange with the at least one adjacent cell to acquire the information of the load of the at least one adjacent cell if a proportion of transmission resources in total transmission resources reaches a third preset threshold; or performing information of load exchange with the at least one adjacent cell to acquire the information of the load of the at least one adjacent cell if one of the air interface resource load, the hardware resource load, and the transmission resource load of the current cell is in an overload status.

22. The device according to claim 19, wherein
the processor is further configured to acquire a synthetic load of the current cell according to one or more of an air interface resource load, a hardware resource load, or a transmission resource load of the current cell, and acquire the information of the load of the at least one adjacent cell according to the synthetic load of the current cell.

23. The device according to claim 22, wherein the synthetic load of the current cell is a sum of a product of the air interface resource load and a first preset coefficient, a product of the hardware resource load and a second preset coefficient, and a product of the transmission resource load and a third preset coefficient.

24. The device according to claim 19, wherein the processor is further configured to acquire a set of candidate target cells according to a handover-related performance parameter between the current cell and the at least one adjacent cell, and determine that a candidate target cell is the target cell in which the mobility parameter needs to be modified thereof if a difference between a load of the candidate target cell and a load of the current cell exceeds a preset threshold.

25. The device according to claim 19, wherein the transmitter is further configured to send a resource status request message to each of the at least one adjacent cell, wherein the resource status request message carries an indication parameter, the indication parameter is configured to indicate that an adjacent cell reports which information of load if an event threshold of the adjacent cell is satisfied, or that an adjacent cell reports which information of load if a report period of the adjacent cell is reached and an event threshold of the adjacent cell is satisfied; and
the receiver is further configured to receive the information of the load sent from the adjacent cell.

26. The device according to claim 25, wherein the event threshold is that a change of a cell load satisfies a preset threshold value.

27. The device according to claim 25, wherein the transmitter is further configured to perform one or more of:
transmitting the resource status request message through an interface with a node to which each of the at least one adjacent cell belongs to the each of the at least one adjacent cell respectively;
transmitting the resource status request message through a mobility management entity (MME) to which the current cell belongs to the at least one adjacent cell;
transmitting the resource status request message through a mobility management entity (MME) to which the current cell belongs and a core network entity to which each of the at least one adjacent cell belongs to the each of the at least one adjacent cell respectively; or
transmitting the resource status request message through one of an element management system (EMS) and a network management system (NMS) to the at least one adjacent cell.

28. The device according to claim 19, wherein the processor is further configured to acquire resource use information of the current cell and calculate load of the current cell according to the resource use information of the current cell.

29. The device according to claim 28, wherein the processor is further configured to acquire physical resource block (PRB) use rates of guaranteed bit rate (GBR) services, signaling bearers and common channels, and calculate the load of the current cell is based on following formula if influence of non-GBR services on system load is not calculated:

load=PRB use rate of GBR services+PRB use rate of signaling bearers+PRB use rate of common channels.

30. The device according to claim 28, wherein the processor is further configured to acquire physical resource block (PRB) use rates of guaranteed bit rate (GBR) services, signaling bearers and common channels, and calculate the load of the current cell based on following formula if load of non-GBR services is calculated according to a minimum guaranteed rate:

$$load = PRB \text{ use rate of } GBR \text{ services} + PRB \text{ use rate of signaling bearers} + PRB \text{ use rate of common channels} + \sum_{x=5}^{9} (PRB \text{ use rate of } QCIx \text{ service} * \text{load proportion factor of } QCIx);$$

wherein the QCI is a quality of service (QoS) class identifier.

31. The device according to claim 28, wherein the processor is further configured to acquire physical resource block (PRB) use rates of guaranteed bit rate (GBR) services, signaling bearers and common channels, and calculate the load of the current cell based on following formula if load of non-GBR services is calculated according to a minimum guaranteed rate:

load=PRB use rate of GBR services+PRB use rate of signaling bearers+PRB use rate of common channels+PRB use rate of non-GBR services*load proportion factor.

32. The device according to claim 28, wherein the processor is further configured to acquire physical resource block (PRB) use rates of guaranteed bit rate (GBR) services, signaling bearers and common channels, and calculate the load of the current cell based on following formula if load of non-GBR services is calculated according to a minimum guaranteed rate:

load=PRB use rate of GBR services+PRB use rate of signaling bearers+PRB use rate of common channels+PRB use rate of service having minimum guaranteed rate in non-GBR services*number of services in non-GBR services.

33. The device according to claim 28, wherein the processor is further configured to acquire physical resource block (PRB) use rates of guaranteed bit rate (GBR) services, signaling bearers and common channels, and calculate the load of the current cell based on following formula if load of non-GBR services is calculated according to a minimum guaranteed rate:

$$load = PRB \text{ use rate of } GBR \text{ services} + PRB \text{ use rate of signaling bearers} + PRB \text{ use rate of common channels} +$$

-continued $$\sum_{x=5}^{9}(PRB \text{ use rate of services having minimum}$$

guaranteed rate in non-$GBR$ services of $QCIx *$ number of services in non-$GBR$ services of $QCIx$);

wherein the QCI is a quality of service (QoS) class identifier.

34. The device according to claim 28, wherein the processor is further configured to set a minimum service unit, and determine a load of a total number of minimum service units equivalent to all services in the cell as the load of the current cell.

35. The device according to claim 28, wherein the processor is further configured to acquire information of service types supported by the current cell, and calculate the load of the current cell according to the resource use information of the current cell comprises:

calculating the load of the current cell according to priorities of quality of service (QoS) class identifiers (QCIs) of service types supported by the current cell.

36. The device according to claim 28, wherein the processor is further configured to acquire performance parameters of the current cell, and calculate the load of the current cell according to the performance parameters of the current cell.

37. The device according to claim 19, wherein the mobility parameter contains one or more of a cell handover parameter or a cell reselection parameter.

38. A non-transitory machine-readable medium having stored thereon, a computer program comprising at least one code section for distributing data, the at least one code section being executable by a machine for causing the machine to perform acts of:

acquiring information of load of a current cell and information of load of at least one adjacent cell neighboring the current cell;

determining a target cell in which a mobility parameter needs to be modified according to the information of the load of the current cell and the information of the load of the at least one adjacent cell, wherein the target cell is one of the at least one adjacent cell;

sending a parameter modification request to the target cell;

receiving a parameter modification response message returned by the target cell;

modifying parameters of the current cell according to content of the parameter modification request if the parameter modification response message indicates modification for the target cell is successful; and abandoning a current modification of the current cell, or initiating a new parameter modification request according to a cause value returned from the target cell, if the parameter modification response message indicates parameter modification for the target cell failed.

\* \* \* \* \*

UNITED STATES PATENT AND TRADEMARK OFFICE
CERTIFICATE OF CORRECTION

| | | |
|---|---|---|
| PATENT NO. | : 8,958,812 B2 | Page 1 of 1 |
| APPLICATION NO. | : 14/159622 | |
| DATED | : February 17, 2015 | |
| INVENTOR(S) | : Niu | |

It is certified that error appears in the above-identified patent and that said Letters Patent is hereby corrected as shown below:

Title page

Item (12) Delete "Weiguo" and insert --Niu--

Item (72) Inventor, please correct the inventor's name to read --Weiguo Niu--

Signed and Sealed this
Second Day of August, 2016

Michelle K. Lee
*Director of the United States Patent and Trademark Office*